April 30, 1968  O. W. BOBLITZ  3,381,268
SAFETY BELT SIGNAL SYSTEMS FOR MOTOR VEHICLES
Filed Oct. 30, 1964  4 Sheets-Sheet 1

INVENTOR.
OLIVER W. BOBLITZ
BY
*Kiernan, Palmer, Howard & Estabrook*
ATTORNEYS

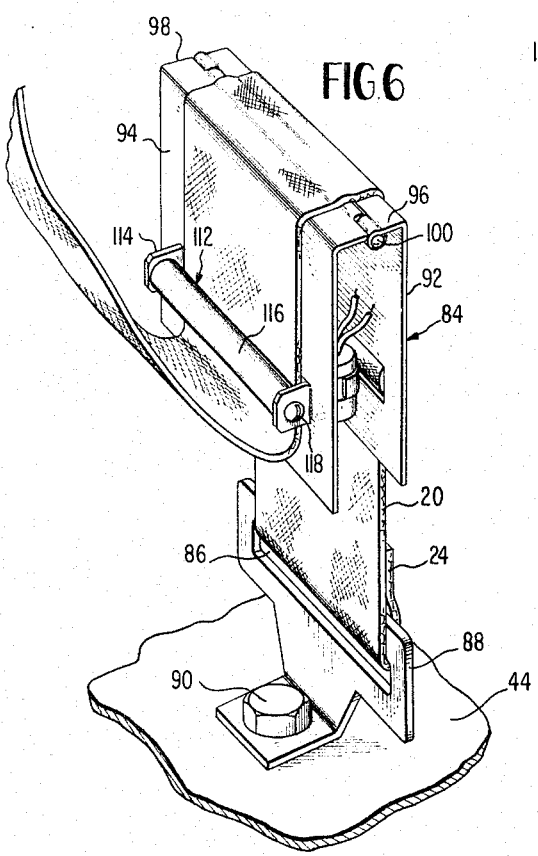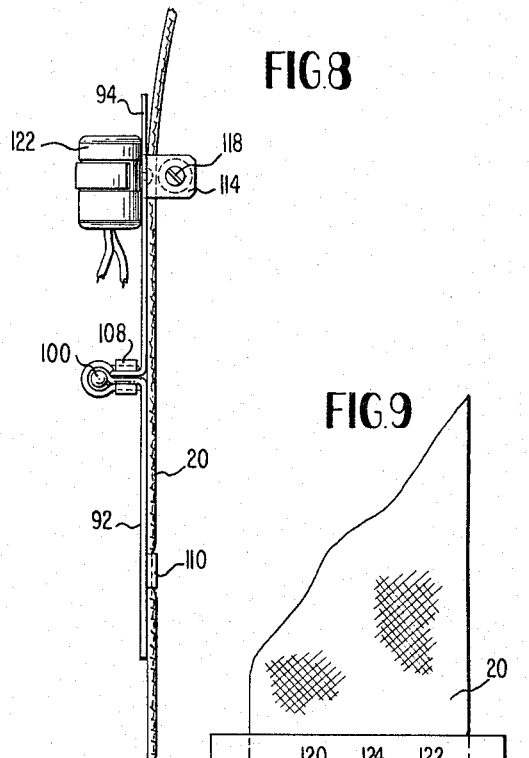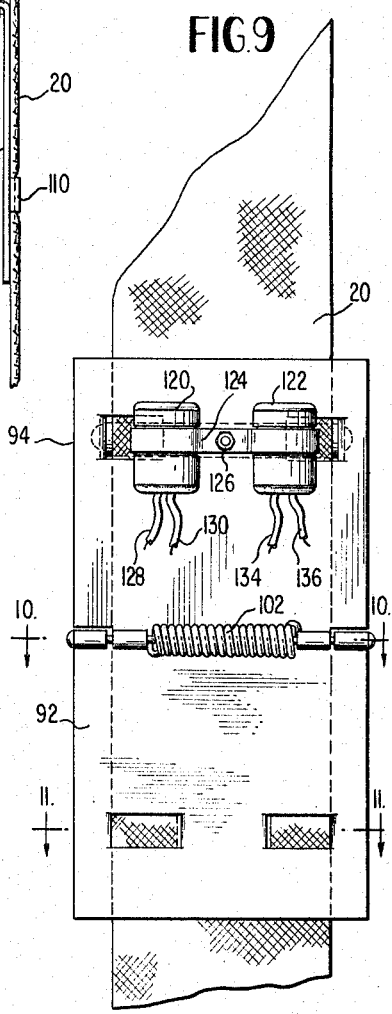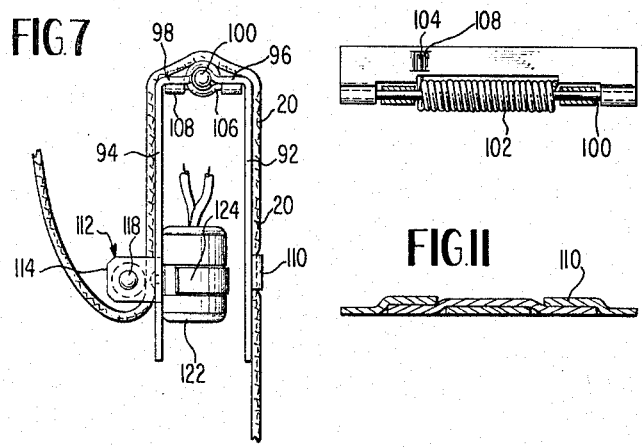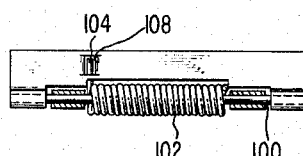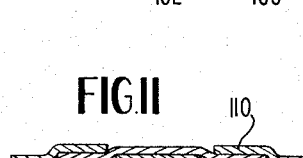
INVENTOR.
OLIVER W. BOBLITZ
ATTORNEYS April 30, 1968     O. W. BOBLITZ     3,381,268

SAFETY BELT SIGNAL SYSTEMS FOR MOTOR VEHICLES

Filed Oct. 30, 1964     4 Sheets-Sheet 3

INVENTOR
OLIVER W. BOBLITZ

BY
ATTORNEYS

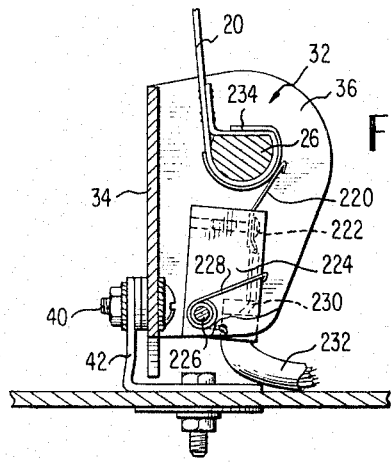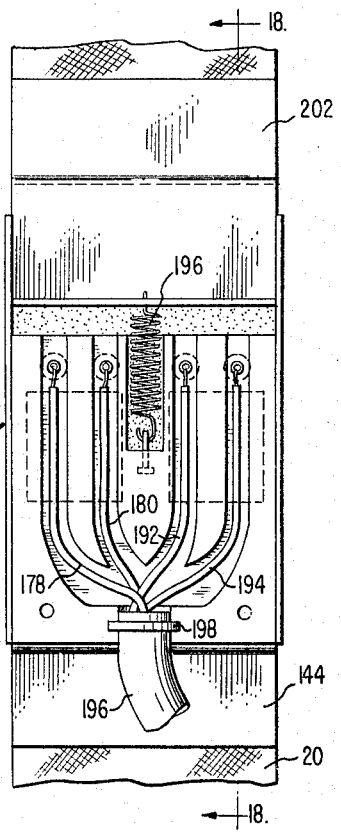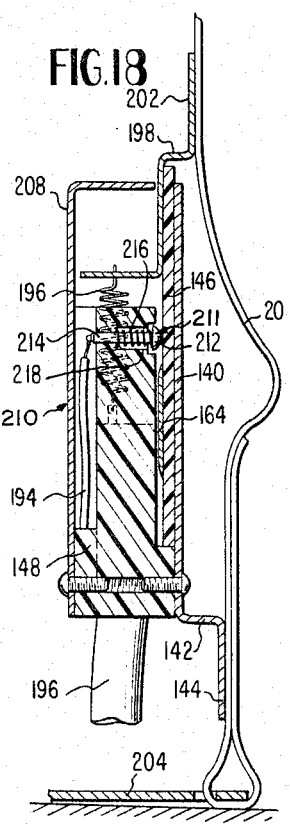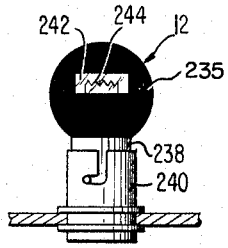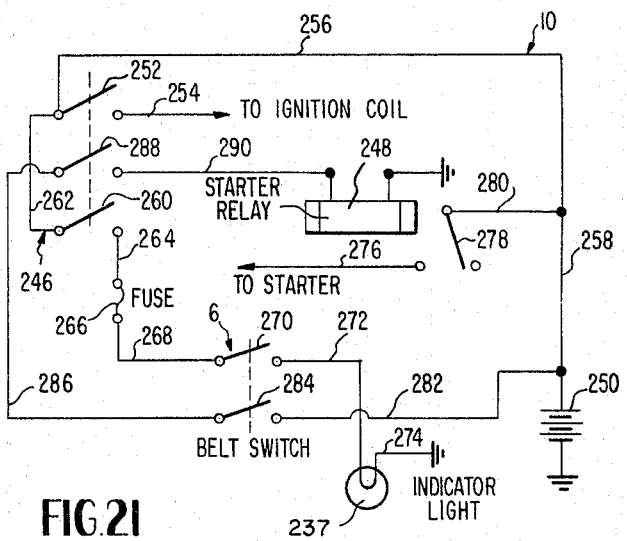

United States Patent Office 3,381,268
Patented Apr. 30, 1968

3,381,268
SAFETY BELT SIGNAL SYSTEMS FOR
MOTOR VEHICLES
Oliver W. Boblitz, 1717 G St. NW.,
Washington, D.C. 20006
Filed Oct. 30, 1964, Ser. No. 407,843
4 Claims. (Cl. 340—52)

ABSTRACT OF THE DISCLOSURE

Safety belt signal systems for motor vehicles that require the operator of the motor vehicle to have his safety belt properly fastened before the vehicle may be started and provide continuing visual indication whether the vehicle is being operated with the seat belt properly fastened are constructed with a switch device that has two independently controlled electric circuits, one involving the motor vehicle starter and the other involving a signal to indicate a fastened condition of the safety belt.

Cross-reference to related application

Reference is made under the provisions of 35 USC 120 to my copending application Ser. No. 369,098, filed May 21, 1964, now abandoned.

Background of the invention

Safety belts, if properly installed in motor vehicles, such as automobiles, motor trucks and the like, may prevent serious injury or death to operators and passengers of motor vehicles. However, proper use of safety belts can be inconvenient either to the vehicle operator or passenger for a number of reasons, and many persons who ride in motor vehicles are not convinced that the use of the seat belt is worth the effort.

Regardless of the shortcomings of motor vehicle safety belts because of public apathy or inconvenience, the proven advantages of such safety devices in preventing injuries and reducing highway deaths, have caused the enactment of laws that make it mandatory in many jurisdictions for certain motor vehicles to have safety belts installed in at least the front seats. Such laws will have the effect only of increasing sales of the seat belts unless some corresponding laws or regulations are set up to make it equally mandatory actually to use the belts.

A variety of schemes and arrangements have been devised for use in connection with vehicle safety belts to remind those persons in the vehicle, by some indicating means, either visual or audible, to fasten the safety belts during use of the motor vehicle, e.g., see U.S. Patents 2,880,789 and 3,112,467.

Vehicle safety belts have also been arranged in combination with electrical ignition or lighting systems of automobiles to either cut out the ignition system of the motor vehicle in the event that a safety belt is not fastened or, in other cases, if too great a strain is placed upon the safety belt as in the case of a collision, e.g., see U.S. Patents 2,802,073 and 2,868,309.

Objects

A principal object of this invention is the provision of new improvements in safety belt systems for motor vehicles. Further objects include:

(1) The provision of a safety belt system for motor vehicles which will prevent the operator of the motor vehicle from starting the motor vehicle until he has actually fastened the safety belt in operating condition about himself while seated within the driver's seat of the vehicle without, however, cutting out the ignition system of the motor vehicle once the motor has been started should the belt be unfastened.

(2) The provision of a motor vehicle safety belt system which enables a police officer or any other party outside of the motor vehicle to visually and easily determine whether, at least the operator of the motor vehicle, has a safety belt installed in the motor vehicle and is actually using the safety belt at the time of observation.

(3) The provision of simple modifying devices which will enable existing safety belt installations to be easily converted to accomplish the improved results of this invention.

(4) The provision of new improved use-indicators or control devices for safety belt systems which are simple in construction and accordingly, economical to manufacture, easy to install and maintain and which involve a minimum of trouble in operation and use.

(5) The provision of electric switch means which may be easily clamped or cemented to a safety belt of a motor vehicle and used to control two independent electrical circuits, one including the starter relay of the motor vehicle and the other a signal light of special design to provide visual indication to an observer from outside the motor vehicle when the safety belt, upon which the switch means is fastened, is in proper use.

(6) The provision of new forms of roll-up devices for safety belts of motor vehicles that include electrical contact means for controlling two electrically independent electrical circuits to provide control over the starting of the motor of the motor vehicle and to provide visual indication of proper use of the safety belt.

(7) The provision of electrical switch means that may be applied to roll-up devices for motor vehicle safety belts to provide automatic switching of electric circuits within the motor vehicle depending upon the position of the seat belt upon the roll-up device.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Summary of the invention

These objects are accomplished according to the present invention by the provision of safety seat belt systems for motor vehicles which require the safety belt of the driver of the vehicle to be fastened before the motor of the motor vehicle may be started, which permit the motor to continue to run even if the safety belt is unfastened after the motor has started and which provide a visual indication that may be observed from outside the motor vehicle when the safety belt is in fastened condition about the driver of the motor vehicle.

These objects are further accomplished by the provision of electric switch means fastened to one of the two sections of a motor vehicle safety belt having two independent contact means for controlling two independent electrical circuits, one of the circuits including the starter relay of the motor vehicle and the other of the circuits including a signal light mounted in the rear window of the motor vehicle to permit the signal light to be viewed by an observer from behind the vehicle, the switch means being connected to the safety belt so that tensioning of the safety belt to fasten it about a person seated in the motor vehicle moves the switch means to a position in which electric current passes through both of said electric circuits, permitting the motor vehicle to be started and lighting the signal light.

The objects are further accomplished by the invention through the provision of light signal or indicator means comprising a special form of electric light bulb having a glass envelope that is opaque except for a small clear window area on one side of the envelope through which the bulb filament may be seen when the bulb is in a vertical position and is viewed at eye level.

*Brief description of the drawings*

A more complete understanding of the new improved safety belt systems of the invention may be had by reference to the accompanying drawings in which:

FIGURE 6 is a perspective view of another form of safety belt device and electric switch means of this invention showing the switch means in an "off" position with the safety belt in a relaxed or unfastened condition.

FIGURE 7 is a fragmentary side view of the electric switch means of the safety belt device shown in FIGURE 6.

FIGURE 8 is a side view of the safety belt switch device of FIGURE 6 with the belt in fastened condition and under tension placing the switch means in an "on" position.

FIGURE 9 is a fragmentary end view of the belt arrangement shown in FIGURE 6, but with the belt in a tensioned, fastened condition as illustrated in FIGURE 8.

FIGURE 10 is a sectional view taken along the line 10—10 of FIGURE 9.

FIGURE 11 is a sectional view taken along the line 11—11 of FIGURE 9.

FIGURE 17 is an enlarged fragmentary end view of a safety belt electric switch device similar to that shown in FIGURE 13 except that plunger type electrical contacts replace the leaf spring form of electrical contacts employed in the switch device of FIGURE 13.

FIGURE 18 is a side sectional view taken along the line 18—18 of FIGURE 17.

FIGURE 19 shows a safety belt device of this invention similar to that shown in FIGURES 4 and 5, but in which the electrical contact unit is in the form of a block which is mounted for pivotal movement within the safety-belt roll-up device.

FIGURE 20 is a side view of an indicator light for use in safety belt installations according to this invention.

FIGURE 21 is a diagrammatic view of an electrical circuit of a safety belt system installed in a motor vehicle in accordance with this invention.

*Discussion of details*

Figure 1:
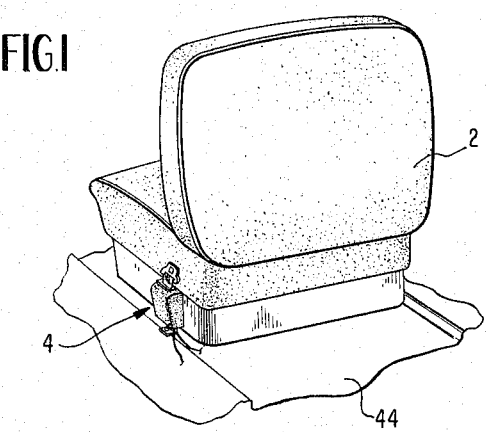
FIGURE 1 is a perspective view of a seat of a motor vehicle equipped with an improved safety belt system as provided by the present invention.

Basically, the new safety belt systems of this invention comprise a seat 2 for the driver of a motor vehicle, a two-piece safety belt generally designated 4, electrical switch means 6, electrical contacts 8, an electrical system 10 and a signal light device 12.

Safety belt device 4 comprises a belt section 20 having a belt buckle 22 fastened at one end by which it and the other section of the safety belt (not shown) may be fastened about a person seated in the seat 2. The end of the belt 24 opposite to the buckle 22 is folded around the roller 26, securely held onto the roller by stitching 28.

The roller 26 is carried in roller means 30 which comprises a yoke 32 formed of a base 34, a first side member 36 and a second side member 38, the roller 26 being journaled in the two side members 36 and 38.

The yoke 32 is fixed by bolt 40 to an L-shaped bracket 42 which, in turn, is fastened to the floor 44 of the motor vehicle by a nut, bolt and washer arrangement 46.

Figure 4:
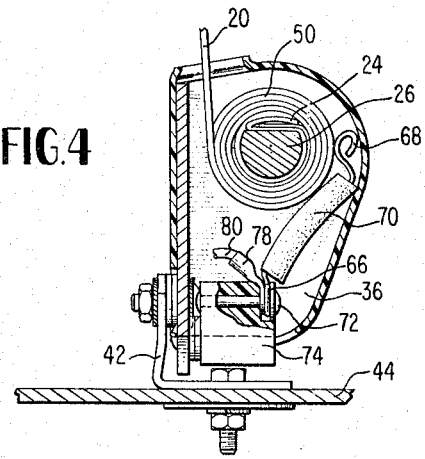
FIGURE 4 is a fragmentary side sectional view taken along the line 4—4 of FIGURE 2.
Figure 5:
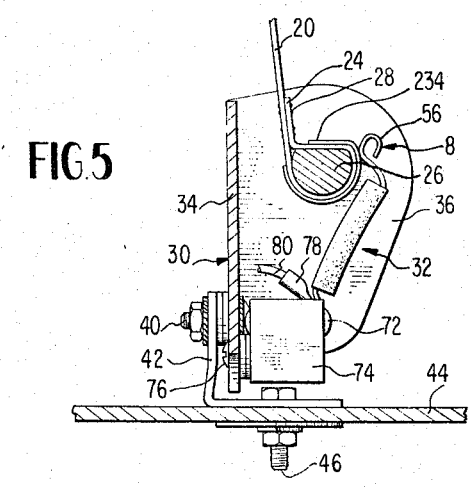
FIGURE 5 is a fragmentary side sectional view taken along the line 5—5 of FIGURE 3.
Figure 12:
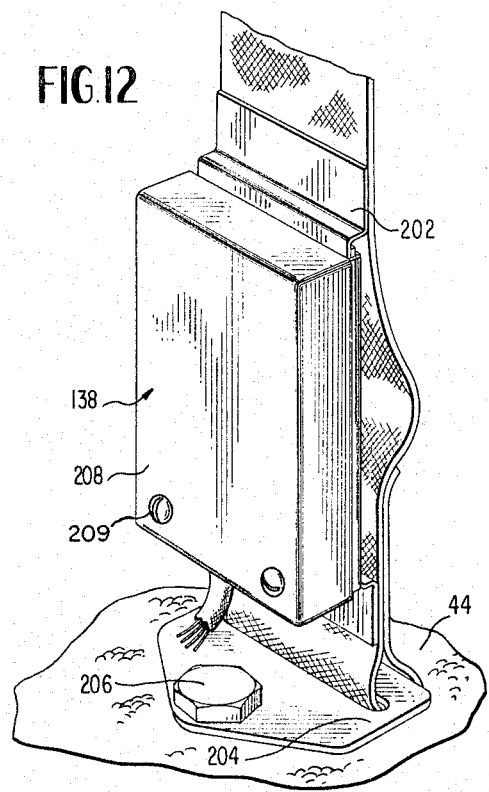
FIGURE 12 is a fragmentary perspective view of yet another form of safety belt system of the present invention.
Figure 13:
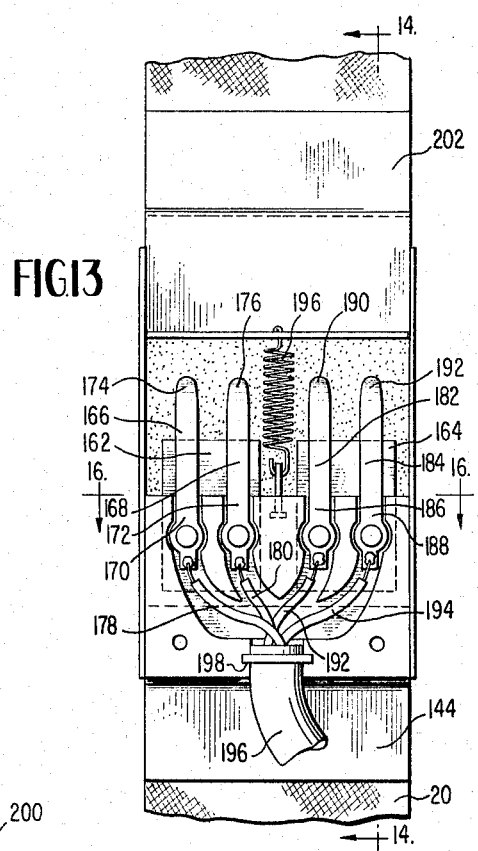
FIGURE 13 is a fragmentary enlarged end view of the safety belt switch device shown in FIGURE 12 with the cover of the device removed exposing its electrical contact elements.
Figures 14, 15:
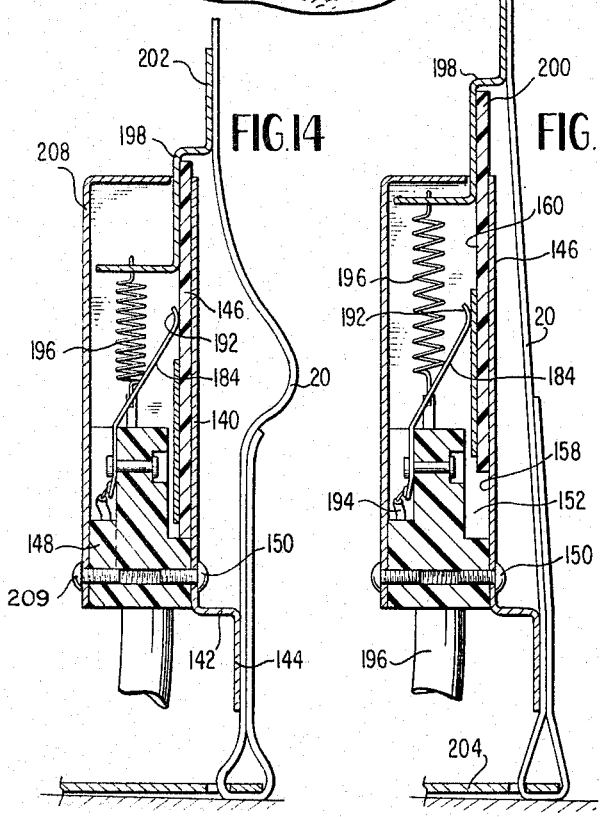
FIGURE 14 is a sectional view of the safety belt arrangement shown in FIGURE 12 taken along the line 14—14 of FIGURE 13.
FIGURE 15 shows the same safety belt device as shown in FIGURES 12 and 13, but with the safety belt under tension created by fastening the belt about a person seated within a motor vehicle in contrast to the relaxed or untensioned condition of the belt when unfastened as shown in FIGURES 12 and 14.
Figure 16:
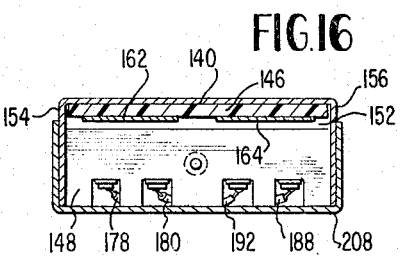
FIGURE 16 is a sectional end view taken along the line 16—16 of FIGURE 13.

A coiled spring (not shown) is carried at the side of the side member 36 under a cover 48 and biases the roller 26 so that the belt 20 is rolled upon the roller in convolutions 50 as shown in FIGURE 4 when tension on the belt 20 is released. When the belt is pulled out to draw it across the lap of a person occupying the motor vehicle seat 2, sufficient tension must be applied to the belt section 20 to overcome the spring biasing of roller 26 unwinding the belt section from the roller as shown in FIGURE 5. The bracket 42, bolts 40 and 46 and yoke 32 are all stoutly made so that the roller 26 is strongly held against movement away from the floor 44 thereby firmly anchoring the belt section 20 to the floor 44 to provide the necessary holding power to prevent the person in the seat 2, with the belt properly fastened, from being thrown forward in the motor vehicle in the event of a collision.

Figure 2:
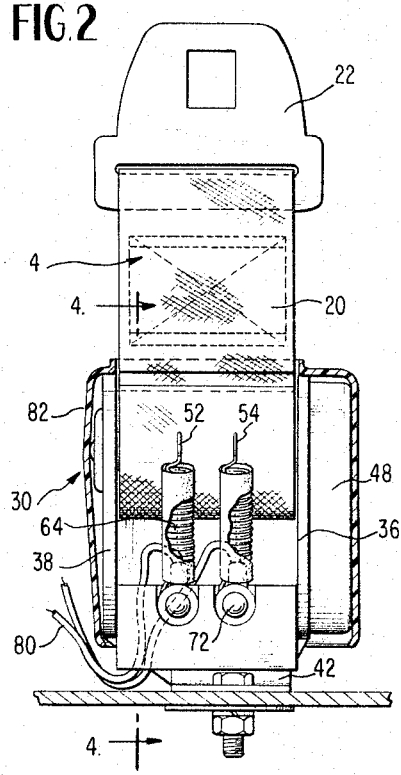
FIGURE 2 is a sectional view of one form of the new seat belt systems which comprises a roller device for retracting the seat belt when not in use.
Figure 3:
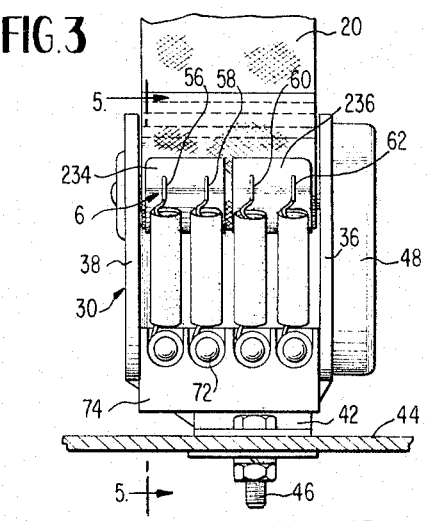
FIGURE 3 is a fragmentary side view of a modified form of a safety belt roll-up and switch device of the general type shown in FIGURE 2.

The two different forms of seat belt roll-up and switch devices shown in FIGURES 2 and 3 are basically the same. The modification shown in FIGURE 2 differs from that shown in FIGURE 3 because the electrical contact means 8 of the form shown in FIGURE 2 comprises only one pair of contacts 52 and 54, whereas the modification shown in FIGURE 3 comprises a first pair of electrical contacts 56 and 58 and a second pair of contacts 60 and 62.

Each of the electrical contacts is formed of a central portion 64 of coiled wire, a fixed end portion 66 and a movable end portion 68, the coiled central portion 64 being covered by electrical insulation tubing 70. The fixed end 66 of the electrical contact members are fastened by rivets 72 to a block of insulation material 74 which is attached to the base portion 34 of the yoke 32 by suitable means such as the screw 76.

The rivets 72 serve to fix the ends 78 of separate electrical lead wires 80 to the block 74 in electrical contact with each of the various contact elements 52–62 respectively.

A dust cover 82 molded of plastic material encloses the yoke and contact members in the safety belt roller means 30 as shown in FIGURES 2 and 4.

In the form of seat belt systems shown in FIGURES 6–11, the electric switch means generally designated 84 is carried upon the belt section 20 that has its lower end 24 inserted through a slot 86 in the bracket 88 which is fastened by bolts 90 to the floor 44 of the motor vehicle. The lower end 24 of the belt 20 is doubled over and stitched or otherwise suitably fastened around the bracket 88 in a manner well known in the art.

The switch means 84 comprises a pair of L-shaped plate members 92 and 94 which are hinged at their ends 96 and 98 respectively by hinge pin 100.

A coiled spring 102 surrounds the middle portion of hinge pin 100 with the spring ends 104 and 106 being carried in depressions 108 formed in the ends 96 and 98 respectively of the plate members 92 and 94. This spring arrangement biases the plate members 92 and 94 into a folded condition as shown in FIGURES 6 and 7 with the plate members positioned in face-to-face relationship.

The plate member 92 is fixed upon the belt section 20 by a pair of tabs 110 which are pressed from the plate 92 and are bent, as shown in FIGURE 11, around the belt section 20.

Plate member 94 has a clasp 112 formed by two tabs 114 pressed from the plate 94 which carries a roller 116 therebetween upon the machine screw 118. The clasp 112 slidably embraces the safety belt section 20 allowing the belt section to accommodate the change in distance between the clasp 112 and the clamp 110 as the plates 92 and 94 of the switch device 84 move from the "off" position as shown in FIGURES 6 and 7 to an "on" position as shown in FIGURES 8 and 9 when the belt is pulled from the relaxed condition shown in FIGURE 6 to a tensioned condition as shown in FIGURE 8 upon proper fastening of the safety belt about a person sitting in the seat 2 of the motor vehicle.

A pair of mercury electric switches 120 and 122 are fixed to the face of plate 94 by a clamp strip 124 and the screw and nut 126. Mercury switch 120 is provided with electric leads 128 and 130 and mercury switch 122 with electric leads 134 and 136 for connection into the electrical system of the motor vehicle in a manner described hereinafter.

In the modification of the invention as shown in FIGURES 12 through 16, safety belt device 138 comprises a flat base 140 having an offset lug 142 with a flat mounting surface 144 cemented to a face of the belt section 20.

A plate 146 formed of dielectric material is attached, by an adhesive or other suitable means, to the face of the flat base 140 opposite to the side of the offset lug 142. A body portion 148 formed of dielectric plastic or other suitable insulation material is fixed to the base 140 by machine screws 150. Body portion 148 is formed with a channel 152 which, in conjunction with side extensions 154 and 156 of the base 140, creates an enclosure for the plate 146 in which the plate may slide in engagement with the inner face 158 of the base 140.

A pair of wafers 162 and 164 made of electrically conductive metal are fixed to the exposed surface 160 of the plate 146. As can be seen from FIGURES 14 and 16, the electrically conductive wafers 162 and 164 cover only a portion of exposed surface 160 of the plate 146 leaving the remaining portion of the surface 160 electrically nonconductive.

A pair of electrical contacts 166 and 168 in the form of leaf springs are riveted at their fixed ends 170 and 172 respectively to the body portion 148. Free ends 174 and 176 of the spring contacts 166 and 168 are spring biased into contact with the plate member 146 when the switch means 138 is in the "off" position due to untensioning of the belt 20 (see FIGURE 14). When the belt 20 is tensioned in fastening about a person seated in the motor vehicle (see FIGURE 15), plate member 146 is moved outwardly from the body portion 148 along the channel 152, bringing the free ends 174 and 176 of the electrical contacts against the electrically conductive wafer 162. This completes an electrical circuit through the contacts 166 and 168 and the terminal wires 178 and 180 which are soldered to the fixed ends 170 and 172 of the spring contacts.

A second pair of electrical spring contacts 182 and 184 are similarly riveted at their fixed ends 186 and 188 so that their free ends 190 and 192 may contact either the base 146 or the electrically conductive wafer 164 depending upon whether the belt section 20 is fastened or unfastened about the passenger of the motor vehicle. Electrical contacts 182 and 184 have electrical leads 192 and 194 soldered to their fixed ends so that this pair of contacts may be electrically connected into a second independent electrical circuit in the motor vehicle. The pair of electrical leads 178 and 180 and the second pair 192 and 194 are enclosed in an insulation sheath 196 forming an electrical cable which is retained in the body portion 148 of the switch means 138 by the clamp ring 198.

The movement of plate 146 producing the "on" or "off" condition of the switch member 138 is produced by the action of coil spring 196 and the bracket member 198 which is attached to the end 200 of the plate 146 opposite to the lug 142. The bracket member 198 has an offset lug 202 providing a flat mounting surface parallel to the base 140 and the two mounting surfaces 144 and 202 provide the means by which the switch means 138 is attached to the belt section 20. Advantageously, the surfaces 144 and 202 are cemented by suitable permanent adhesive to the face of the belt section 20 so that when the belt section is pulled up to its fullest extent (see FIGURE 15), the plate 146 will be moved along channel 152 into a position where the electrically conductive wafers 162 and 164 come in contact with the ends of the electrical contacts 166–168 and 182–184. Such positioning of the mounting surfaces 144 and 202 upon the belt section 20 can be readily attained if safety belt device is produced as an integral unit using an assembly jig at the manufacturing plant. On the other hand, if the switch member 138 is separately installed in a motor vehicle to a belt section already mounted upon the floor 44 of the motor vehicle such as by a bracket 204 and bolt 206, then proper spacing of the mounting surfaces 144 and 202 along the belt section 20 can be accomplished by use of a cement applicator template furnished as an accessory in the sale of the switch means 138.

The electrical contacts and other internal components of switch means 138 are enclosed by a cover 208 which is held in place by screws 209 threaded into the block through suitable holes in the cover.

The form of switch means 210 shown in FIGURES 17 and 18 is basically similar to that shown in FIGURES 12–16 except as to the form of electrical contacts. Instead of leaf spring contacts as used in switch means of FIGURE 13, the modified form shown in FIGURES 17 and 18 employs plunger contacts 211 having an enlarged head portion 212 attached to a shaft 214 journaled in the block 148 with a small spring 216 compressed between the enlarged head 212 and the base of the hole 218 in the block 148. The rear end of the contact shaft 214 is soldered to its lead wire, which in the case of FIGURE 18 is lead wire 194. The separate lead wires 178–194 which are soldered to the respective plunger-type contacts emerge from the switch means 210 in a cable sheath 196 in the manner described in connection with the switch means illustrated in FIGURES 12–16.

FIGURE 19 shows a modified form of belt retractor or rollup device equipped with electrical switch means of the same general type as shown in FIGURES 2–5, including, however, a modified form of electrical contact arrangement. In the belt rollup and switch device of FIGURE 19, the electrical contact element 220 is in the form of a stiff wire fastened at one end by a rivet or screw 222 on a block of plastic insulation material 224. This block pivots about a pin 226 which extends between the side portions 36 and 38 of the yoke 32. The block, and in turn the electrical contact 220, is urged toward the roller 26 by spring 228.

The modified form of belt rollup device shown in FIGURE 19 can be equipped with a single pair of electrical contacts 220 (compare FIGURE 2) or a plurality of pairs of electrical contacts (compare FIGURE 3). Either way, all electrical contacts 220 are electrically connected to separate lead wires 230 which emerge from the plastic block 224 in the form of a cable having an enclosing insulation sheath 232.

The rollup devices shown in FIGURES 2–5 and 19 operate as electrical switch means by the inclusion of metal clips 234 which serve as contact plates for the ends of the electrical contact elements when the belt section 20 is completely unwound from the roller 26. A single metal clip may be used in rollup devices such as shown in FIGURES 2 and 4, including only one pair of electrical contacts 52 and 54, or two such metal clips 234 and 236 will be included in rollup devices, such as shown in FIGURES 3 and 5, where multiple pairs of electrical contacts 56–58 and 60–62 are employed. With the belt section 20 completely unwound from the roller 26 shown in FIGURE 5, the free end of the electrical contacts 56 and 57 will engage the metal clip 234 closing the electrical circuit through contact elements 56 and 58 via the metal clip 234. Similar electrical connection will be made between contact elements 60 and 62 by the metal clip 236. In the form of rollup device shown in FIGURE 19, metal clips 234 will close a circuit through the electrical leads 230 by contacting the ends of the contact elements 220.

As previously indicated, the new safety belt accessories can control the operation of an indicator or signaling device to show an observer standing outside of the motor vehicle whether the safety belt, at least for the driver of the vehicle, is properly fastened. Various light and circuit arrangements can be used to accomplish this in conjunction with the switch devices of this invention. For example, safety experts are now advocating the use of a white light of relatively high intensity upon the front of an automobile, preferably centrally located, in order to draw attention to the motor vehicle as it approaches. Thus, it has been found that automobiles on high-speed highways tend to blend with the horizon or background and are not observed by approaching drivers as quickly as may be desired for greatest safety. The use of a white light on the front of a vehicle causes the driver of another vehicle to observe this oncoming vehicle at a greater distance, even in daytime operation of automobiles, thereby providing greater time of reaction for avoidance of a collison or to take other remedial action thereby producing a consequent increase in the safety of operation of motor vehicles. The belt switch means of this invention may be electrically connected to such indicator lights so that upon the fastening of the seat belts by the driver of the motor vehicle in question, this white indicator light at the front of the motor vehicle will become illuminated and remain lit as long as the driver's safety belt is fastened.

An alternative and preferred method of providing visual indication of the fastened condition of safety belts within the motor vehicle is accomplished by a special form of indicator device shown in FIGURE 20. This comprises an electrical light bulb 12 having a glass envelope 235 sealed in usual fashion to a bayonet-type connector base 238 which will fit into a suitable light socket 240. The glass envelope 235 is opaque except for a small window area 242 at one side of the glass envelope through which the bulb filament 244 may be seen when the bulb is in a vertical position and is viewed at eye level. Advantageously, the clear window is colored light blue to provide a distinguishing color which can be recognized by police officers as a safety belt indicator light. A bulb of this type can be produced by making the entire glass envelope of blue colored glass and blacking out all of the envelope all except for the window area 242. Alternatively, a bulb with completely transparent glass envelope can be covered with a metal shield having a stamped out window area. Advantageously, such light buib will have a candle power of 20 to 32 operating at 6 to 12 volts with the window area 242 permitting a transmission of at least 85% of the light emitted by the bulb filament. This will permit viewing of the safety belt indicator light in the daytime at a distance of 100 feet when the indicator device 12 as shown in FIGURE 20 is mounted at the rear window of a motor vehicle. A simple bulb having a completely clear glass envelope has been found unsatisfactory because when the motor vehicle is driven at night with the seat belt attached and the indicator light on, the interior of the motor vehicle is flooded with light which can be annoying or dangerous to the driver of the motor vehicle.

FIGURE 21 diagrammatically illustrates a preferred electrical circuit 10 for a motor vehicle incorporating the new safety belt systems of this invention. It comprises an ignition and accessory switch 246, a starter relay 248, a battery 250, the indicator light 237 and the belt switch means 6.

A switch element 252 is connected to the ignition coil by wire 254 with the battery 250 through wire 256 and cable 258.

A switch element 260, which is the normal "accessory connection" to a standard form of automotive ignition and accessory switch, connects the battery 250 to the indicator light 237, through cable 258, wires 256, 262 and 264, fuse 266, wire 268, belt switch element 270 and wire 272. The other side of the indicator light leads to ground through wire 274. The element 270 in the diagrammatic FIGURE 21 could be, with reference to FIGURE 13, the two switch contacts 166 and 168 plus the conductive wafer 162 while the wire 268 could be lead 178 and wire 272 could be the lead 180. Equivalent parts of other modified forms of switch elements as shown, for example, in FIGURES 2, 3, 6 or 18 would be represented by the switch element 270 and connecting the wires 268 and 272.

The fuse 266 is preferably of low amperage, such as about 2 to 5 amperes, to protect the indicator light circuit against overload and possibility of fire in the event of short circuit.

The starter relay 248 connects to starter (not shown) through cable 276, relay switch 278, cables 280 and 258 to the battery 250.

A relay switch 278 operates in known fashion when starter relay 248 is energized by current coming from the battery through the lead 282, switch element 284, wire 286, switch element 288 and wire 290. The switch element 288 is the normal override switch used to engage the starter relay by override of the ignition switch for so long as is required by the stater motor to start the internal combusion engine of the motor vehicle.

The switch element 284, again with reference to FIGURE 13, would constitute the two switch contacts 182 and 184 while the wire 282 would in part be the lead 192 and the wire 286 would in part be the lead 194. Again, equivalent elements from the other forms of switch devices of the invention would correspond to the belt switch element 284 shown in the circuit diagram of FIGURE 21.

The operation of the new safety belt systems of the invention can be understood by reference to the sheet of drawings, particularly FIGURES 17 through 21. The operator of the motor vehicle upon being seated in seat 2 of the motor vehicle would be required to tension the safety belt section 20 in order to fasten the belt properly about him. If an attempt is made to start the motor vehicle without doing this, switch element 284 would not close the circuit between the battery 250 and the starter relay 248 so that when the ignition switch override element 288 connected wire 286 to wire 290, the starter relay would not be energized and the car could not be started. The belt section 20 would remain in an untensioned condition as shown in FIGURE 18 and no contact would be made through electrical contacts 211 diagrammatically represented in FIGURE 21 as switch element 284. On the other hand, as soon as the belt is tensioned sufficiently to properly fasten it about the driver of the motor vehicle, switch element 284 makes contact between wires 282 and 286, thus permitting the starter relay 248 to be energized as soon as the override switch element 288 is properly engaged by the operator of the motor vehicle. In the case of the rollup form of switch elements, such contact of switch element 284 between wires 282 and 286 would be accomplished, as shown in FIGURE 19, with the belt unrolled from roller 26 and metal clip 234 contacting the free end of the two electrical contacts 220 completing a circuit through the lead wires 230 which would correspond to connector wires 282 and 286.

If after the motor of the vehicle has ben started, the seat belt is unfastened by the vehicle driver, the motor will not be shut off since the unfastening of the belt disconnecting wire 282 from 286 through the switch element 284 would not affect the ignition coil circuit comprising ignition switch element 252 and lead wires 254 and 256.

When the belt section 20 is under tension due to proper fastening about the motor vehicle driver, and with the ignition and accessory switch in the "on" position, the indicator light 237 would be energized by switch element 270 making connection between wires 268 and 272. Should the motor vehicle driver unfasten the seat belt, which as indicated above would not cause the motor vehicle to stop so long as the ignition switch 246 remained in the "on" position, nevertheless unfastening of the belt would be immediately indicated by extinction of the indicator light 237.

While the description of the invention has been directed mainly to arrangements for the driver's seat of a motor vehicle, the invention may be applied to passenger seats as well. Switch means of the invention having multiple pairs of electrical contacts to control a plurality of separate electrical circuits could be used for the passenger seats simply by not using one of the pairs of electrical contacts. Switch means having only one pair of electrical contacts such as shown in FIGURE 2 can advantageously be used in installing or modifying safety belts for the passenger seats of motor vehicles. A separate indicator light such as light 237 of FIGURE 20, can be used in the motor vehicle for each separate seat. Advantageously, however, all of the safety belts of all of the seats may have their switch means connected in series for controlling an indicator light 237. In such event, all safety belts in the motor vehicle would need to be in a fastened condition in order for the indicator light to be "on." For more sophisticated installation, a multiple pole switch can be employed to engage only the safety belt switch means of seats actually occupied by passengers with the indicator light circuit.

The new and improved forms of safety belt systems for motor vehicles as described above offer practical and convenient arrangements by which to enforce the use of safety belts in motor vehicles. Such enforcement will be a necessary supplement to the legal requirement for the presence of such belts in motor vehicles. Thus, with seat belt systems of this type, drivers and passengers of motor vehicles will not only have seat belts available, but will be required to use them and thus obtain the benefit of the safety inherent with the use of such safety belts.

What is claimed as new and desired to be protected by United States Letters Patent is defined by the following claims:

1. A two-piece safety belt for a motor vehicle comprising:
   (A) means for fastening the belt sections together about a person,
   (B) spring means connected to a part of the belt biasing the belt sections apart from one another thereby to require tensioning of the belt to fasten it about said person,
   (C) switch means controlled by said spring means so that said switch means assumes an "off" position when the spring means retracts the belt sections from a fastened condition and an "on" position when the belt sections are fastened about said person with at least a predetermined minimum degree of tension,
   (D) said switch means comprising at least two electrically independent contact means for controlling two independent electrical circuits, and
   (E) separate terminal elements electrically connected to said independent contact means for electrically connecting one of said contact means into the starter circuit of a motor vehicle in which the safety-belt is installed and for electrically connecting the other contact means to a signal circuit to indicate a fastened condition of said safety belt.

2. In a motor vehicle provided with a safety seat belt and electric means actuated by tensioning of the safety belt about a person seated on the motor vehicle with at least a predetermined minimum degree of snugness to indicate a proper condition of use of the safety belt, the improvement consisting of electric switch means comprising:
   (A) a spring-biased roller around which one end of said safety belt is rolled when tension upon the belt is released,
   (B) bracket means in which said roller is journaled,
   (C) a pair of electrical contact members carried at one end by said bracket means, the other ends thereof being spring-biased toward said roller for contact therewith,
   (D) an electrically conductive surface on said roller which is engaged by said electrical contacts when said safety belt is fully unrolled therefrom, said surface being continuous between the contacts whereby an electric circuit is formed through said contacts by their contact with said surface.

3. A safety belt system for a motor vehicle that requires the safety belt to be fastened with at least a predetermined minimum tension by the occupant of the seat serviced by the safety belt comprising switch means having two independent contact means for controlling two independent electrical circuits, one of said circuits including the starter relay of the motor vehicle, the other of said circuits including a signal device mounted in the motor vehicle, said switch means being spring biased to a position in which no electric current passes in said electrical circuits, said switch means being connected to a safety belt fastened in said motor vehicle so that tensioning of the safety belt to fasten it about a person seated in the motor vehicle moves the switch means to a position in which electric current passes through both of said electrical circuits, permitting the motor vehicle to be started and energizing said signal device.

4. A safety seat belt system for a motor vehicle which automatically indicates when the safety belt has been properly fastened by the occupant of the seat serviced by the safety belt which comprises roll-up means to retract the safety belt when not in use, switch means operated by movement of said roll-up means, said switch means having two independent contact means for controlling two independent electrical circuits, the first of said circuits including the starter relay of the motor vehicle, the second of said circuits including a signal device mounted in the motor vehicle, said switch means being spring biased to a position in which no electrical current passes in said first circuit and requiring that a predetermined amount of tension be applied to said safety belt to move said switch means to a position in which electrical current may pass in said first circuit.

References Cited
UNITED STATES PATENTS

| | | | |
|---|---|---|---|
| 3,217,291 | 11/1965 | King | 200—61.15 X |
| 3,226,674 | 12/1965 | Erikson | 340—278 X |
| 3,237,710 | 3/1966 | MacDonald | 340—278 |
| 2,441,824 | 5/1948 | Kurlander | 240—49 |
| 2,488,858 | 11/1949 | Franz | 242—107 |
| 2,510,115 | 6/1950 | Jakosky. | |
| 2,868,309 | 1/1959 | Burgess | 280—150 |
| 2,949,529 | 8/1960 | Ogawa | 240—46.49 |

(Other references on following page)

UNITED STATES PATENTS

| | | | |
|---|---|---|---|
| 3,112,467 | 11/1963 | Benning | 340—52 |
| 3,133,277 | 5/1964 | Hood | 340—278 |
| 3,146,431 | 8/1964 | Betts | 340—259 |
| 3,147,819 | 9/1964 | Keleher. | |
| 3,154,167 | 10/1964 | Butler et al. | 180—82 |
| 3,185,246 | 5/1965 | Maurer | 280—150 |

FOREIGN PATENTS 237,466  9/1960  Australia.

JOHN W. CALDWELL, *Primary Examiner.*

BENJAMIN HERSH, NEIL C. READ, A. H. WARING, *Examiners.*

E. E. PORTER, R. M. GOLDMAN, *Assistant Examiners.*